United States Patent

[11] 3,601,495

| [72] | Inventor | Cyril John Bean<br>Coventry, England |
| --- | --- | --- |
| [21] | Appl. No. | 858,308 |
| [22] | Filed | Sept. 16, 1969 |
| [45] | Patented | Aug. 24, 1971 |
| [73] | Assignee | Rolls-Royce Limited<br>Darby, England |
| [32] | Priority | Sept. 20, 1968 |
| [33] | | Great Britain |
| [31] | | 44950/68 |

[54] BEARING ASSEMBLY
12 Claims, 1 Drawing Fig.

[52] U.S. Cl. .................................................. 415/110,
308/227
[51] Int. Cl. ....................................................... F01d 11/00
[50] Field of Search ........................................... 415/110,
170; 308/187, 227; 184/6 TS

[56] References Cited
UNITED STATES PATENTS

| 2,322,824 | 6/1943 | Büchi.......................... | 415/170 |
| 2,866,620 | 12/1958 | Williams...................... | 415/170 |
| 3,147,913 | 9/1964 | Davies et al. ................. | 184/6 TS |

*Primary Examiner*—C. J. Husar
*Attorney*—Cushman, Darby & Cushman

ABSTRACT: A bearing assembly comprising an annular rotor portion, a stator portion about which the rotor portion is mounted for rotation about a stator portion and which defines a substantially closed annular chamber therewith, the stator portion including a stator member which extends transverse to the axis of rotation of the rotor portion and which carries at least one thrust bearing which engages an internal surface of the rotor portion. The bearing assembly is for use in a substantially vertically arranged gas turbine engine.

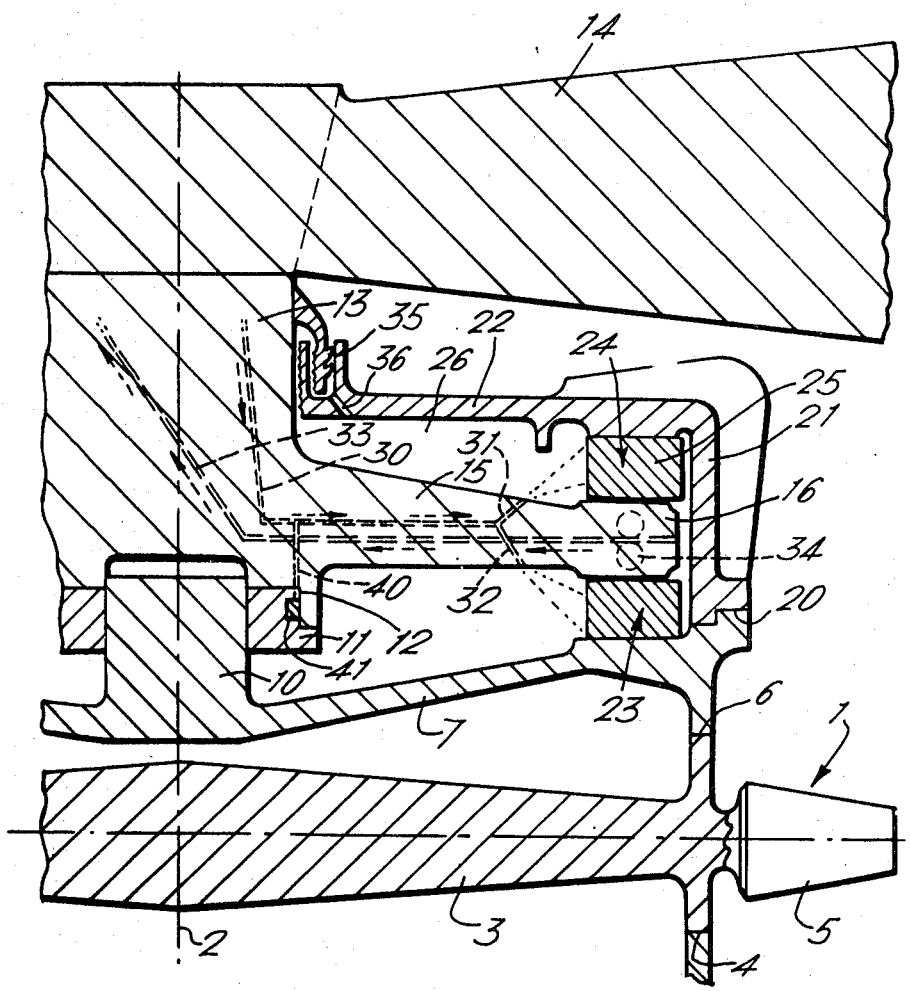

BEARING ASSEMBLY

This invention concerns a bearing assembly.

According to one aspect of the present invention, there is provided in a substantially vertically arranged gas turbine engine a bearing assembly for supporting the rotor shaft of the engine, the assembly comprising a stator and an annular rotor disposed radially outwardly of the stator to define a substantially closed annular chamber therewith for retaining lubricant, the stator including a stator member which extends radially into the chamber, a bearing being provided between the stator member and an internal surface of the chamber.

In another aspect, the invention provides a bearing assembly comprising an annular rotor, a stator about which the rotor is mounted for rotation and which defines a substantially closed annular chamber therewith, the stator including a stator member which extends radially of the axis of rotation of the rotor and which carries at least one thrust bearing which engages an internal surface of the rotor, the thrust bearing comprising a plurality of angularly spaced-apart thrust pads which are tiltably mounted on the stator member, means being provided for maintaining a hydrodynamic film of lubricant between each thrust pad and the rotor.

There may be two thrust bearings which are respectively disposed on opposite sides of the stator member, for withstanding loads in both axial directions.

The, or each, thrust bearing may comprise a plurality of angularly spaced-apart thrust pads which are tiltably mounted on the stator member, means being provided for maintaining a hydrodynamic film of lubricant between each thrust pad and the rotor portion.

Lubricant supply means may be provided for directing lubricant through said chamber and onto said thrust bearing.

Thus the lubricant supply means may comprise supply ducting which extends through the stator member. Moreover, return ducting may also extend through the stator member, means being provided for returning lubricant, which has passed through the or each thrust bearing, back through the return ducting.

A labyrinth seal may be provided between the rotor and stator portions, the rotor portion being apertured so that lubricant mist which has passed through the labyrinth seal and condensed may return to the said chamber.

In another aspect, the invention provides a bearing assembly comprising an annular rotor, a stator about which the rotor is mounted for rotation and which defines a substantially closed annular chamber therewith, the stator including a stator member which extends radially of the axis of rotation of the rotor and which carries at least one thrust bearing which engages an internal surface of the rotor, the rotor comprising a stub shaft which is rotatably mounted in the stator by means of a bearing.

Thus, means may be provided for supplying lubricant to the last-mentioned bearing and for passing it therefrom to the said chamber and so to the respective thrust bearing.

The rotor is preferably a bladed rotor of a fluid flow machine, such for example as a gas turbine engine.

The invention is illustrated merely by way of example in the accompanying drawing, which is a broken-away sectional view of a part of a gas turbine engine provided with a bearing assembly according to the present invention.

Referring to the drawing, a vertically mounted gas turbine engine has a turbine 1 which is rotatable about a vertical axis 2. The turbine 1 comprises a plurality of rotor discs 3 (only one shown) which are welded to each other as indicated at 4 and each of which carries a plurality of angularly spaced blades 5.

The uppermost rotor disc 3 is welded at 6 to a disc member 7 which extends from a stub shaft 10 in an upwardly inclined direction transverse to the axis 2. The stub shaft 10 is provided with a journal bearing 11 which is disposed within a recess 12 in a stator member 13. The stator member 13 is disposed on the axis 2 and is secured to stationary structure 14. A stator disc 15, which extends from the stator member 13 in a direction transverse to the axis 2, is provided at its periphery with a stationary collar 16.

Bolted at 20 to the disc member 7 is an axially extending flange 21 which extends from an annular disc member 22, the disc member 22 itself extending transverse to the axis 2. The rotatable disc members 7, 22, which are thus disposed on opposite sides of the stator disc 15, respectively engage thrust bearings 23, 24, which are respectively disposed on opposite sides of the stator disc 15. As will be appreciated, the disc members 7, 22 from an annular rotor portion which is mounted for rotation about the stator portion constituted by the stator member 13 and stator disc 15, the thrust bearings, 23, 24 engaging internal surfaces of the said annular rotor portion.

Each of the thrust bearings 23, 24 may comprise a plurality (e.g. six) of equiangularly spaced-apart, nonrotatable pads 25 which are mounted on the stator disc 15 to tilt through a small angle, e.g. by providing a small curvature on the adjacent surfaces of the pads 25 and collar 16. Each pad 25 may be a hard metal pad which is faced with a soft bearing alloy, a hydrodynamic film of oil being maintained (by means not shown) between the disc members 7, 22 and the pads 25.

The thrust bearings 23, 24 may be such as to resist an axial load in either direction of 1,200 p.s.i.

As will be seen, the stator member 13, and disc members 7, 22 define walls of a substantially closed annular chamber 26.

A lubricant supply duct 30 extends through the stator disc 15 to supply lubricant to two branch ducts 31, 32 which extend at above and below the stator disc 15 to the chamber 26, and onto the thrust bearings 23, 24. Lubricant which has passed through the thrust bearings 23, 24 passes to a lubricant return duct 33 which extends through the stator disc 15. A pump 34 forces the lubricant through the lubricant return duct 33 to a sump (not shown).

A labyrinth seal 35 is provided between the rotor disc 22 and the stator member 13. The rotor disc 22 is provided with an aperture 36 therethrough, such that lubricant mist which has passed from the chamber 26 through the labyrinth seal 35, and has condensed therein, may return through the aperture 36 to the chamber 26.

Some of the lubricant passing through the lubricant supply duct 30 flows to a branch duct 40 and so to a reservoir 41 from which it passes to lubricate the journal bearing 11. The lubricant which has passed through the journal bearing 11 passes to the chamber 26 and so is forced centrifugally up the upper surface of the disc member 7 towards its radially outer end. In consequence, this lubricant will reach the thrust bearing 23 and will thus be returned by the pump 34 into the lubricant return duct 33.

It will be appreciated that, in operation, centrifugal forces will ensure that any lubricant in the chamber 26 will be flung out towards the thrust bearings 23, 24 and will be disposed closely adjacent thereto. There will therefore be little danger of seepage of lubricant from the chamber 26. Indeed, the only place where it is possible for the lubricant to seep out is through the labyrinth seal 35, and most of the mist passing through the latter will condense and return through the aperture 36 to the chamber 26.

I claim:

1. In a substantially vertically arranged gas turbine engine, a bearing assembly for supporting a vertical rotor shaft of the engine, said bearing assembly comprising a stator and an annular rotor disposed radially outwardly of the stator to define a substantially closed annular chamber therewith for retaining lubricant, said stator including a stator member which extends radially into said annular chamber, and a bearing between said stator member and an internal surface of the chamber.

2. In a substantially vertically arranged gas turbine engine as claimed in claim 1 wherein said bearing is a thrust bearing and is provided between said stator member and an axially facing surface of the chamber.

3. In a substantially vertically arranged gas turbine engine as claimed in claim 2 in which there are two thrust bearings which are respectively disposed on opposite sides of the stator member for withstanding loads in both axial directions.

4. A bearing assembly comprising an annular rotor, a stator about which the rotor is mounted for rotation and which defines a substantially closed annular chamber therewith, the stator including a stator member which extends radially of the axis of rotation of the rotor and which carries at least one thrust bearing engaging an internal surface of the rotor, said first bearing comprising a plurality of angularly spaced-apart thrust pads which are tiltably mounted on the stator member, means being provided for maintaining a hydrodynamic film of lubricant between each thrust pad and the rotor.

5. A bearing assembly as claimed in claim 4 in which the rotor portion is rotatable about a vertical axis.

6. In a substantially vertically arranged gas turbine engine as claimed in claim 1 in which lubricant supply means are provided for directing lubricant through said chamber and onto the said bearing.

7. In a substantially vertically arranged gas turbine engine as claimed in claim 6 in which the lubricant supply means comprise supply ducting which extends through the stator member.

8. In a substantially vertically arranged gas turbine engine as claimed in claim 7 in which return ducting also extends through the stator member, means being provided for returning lubricant, which has passed through the bearing, back through the return ducting.

9. In a substantially vertically arranged gas turbine engine as claimed in claim 1 in which a labyrinth seal is provided between the rotor and stator, the rotor being apertured so that lubricant mist which has passed through the labyrinth seal and condensed may return to the said chamber.

10. A bearing assembly comprising an annular rotor, a stator about which said rotor is mounted for rotation and which defines a substantially closed annular chamber therewith, said stator including a stator member which extends radially of the axis of rotation of the rotor and which carries at least one thrust bearing which engages an internal surface of the rotor, said rotor comprising a stub shaft which is rotatably mounted in the stator by means of a bearing.

11. A bearing assembly as claimed in claim 10 in which means are provided for supplying lubricant to the last-mentioned bearing and for passing it therefrom to the said chamber and so to the respective thrust bearing.

12. A bearing assembly as claimed in claim 4 in which the rotor is a bladed rotor of a fluid flow machine.